United States Patent [19]
Hough et al.

[11] 4,395,939
[45] Aug. 2, 1983

[54] SUNROOF AIR SCREEN

[76] Inventors: Louis E. Hough, 22448 Statler, St. Clair Shores, Mich. 48081; Walter J. De Vigili, 16082 Dugan Rd., Roseville, Mich. 48066

[21] Appl. No.: 230,823

[22] Filed: Feb. 2, 1981

[51] Int. Cl.³ ............................ B60H 1/26; B60H 3/06
[52] U.S. Cl. ....................................... 98/2.14; 160/92; 160/97; 296/216
[58] Field of Search .................... 98/2.11, 2.14, 41 SV, 98/88 S; 296/217, 216, 218; 160/92, 97, 222; 49/379, 386

[56] References Cited

U.S. PATENT DOCUMENTS

| | | | |
|---|---|---|---|
| 1,877,065 | 9/1932 | Selby | 160/92 |
| 2,839,985 | 6/1958 | Ross | 98/2.14 |
| 2,939,375 | 6/1960 | Herman | 98/2.14 X |
| 3,062,278 | 11/1962 | Indorante | 160/92 |
| 3,922,032 | 11/1975 | Schaller | 98/2.14 X |
| 4,205,875 | 6/1980 | Smith | 98/2.14 X |

FOREIGN PATENT DOCUMENTS

| | | | |
|---|---|---|---|
| 184834 | 6/1955 | Fed. Rep. of Germany | 98/2.14 |
| 366466 | 12/1938 | Italy | 296/216 |
| 1210654 | 10/1970 | United Kingdom | 98/41 SV |

Primary Examiner—Albert J. Makay
Assistant Examiner—Harold Joyce
Attorney, Agent, or Firm—Krass, Young & Schivley

[57] ABSTRACT

An air screen for vehicle sunroofs extends between the leading edges of an open sunroof panel and the vehicle's roof to regulate intake air flow and prevent potentially dangerous projectiles from being carried into the vehicle's interior along with the air flow. The air screen is formed from flexible plastic material and deflects into a storage position when the sunroof panel is pivoted from an open scoop position to a closed position. The air screen may be secured to either the sunroof panel or the roof and consists of two halves slidable relative to each other so as to permit regulation of the air flow therethrough. The air screen also functions as an air deflector to prevent wind buffeting effects when the panel is completely removed from the roof.

19 Claims, 10 Drawing Figures

SUNROOF AIR SCREEN

TECHNICAL FIELD

The present invention broadly relates to sunroof apparatus for vehicles, particularly those of the type which may be elevated along the leading edge thereof so as to present an air scoop, and deals more particularly with a screen for filtering the air flowing through the air scoop opening.

BACKGROUND ART

At least one new vehicle sunroof design of the type employing a removable sunroof panel is pivotally connected to the sunroof along the rear edge of the panel so as to permit the leading edge to be swung upwardly above the roof, thus forming an air scoop opening through which outside air is drawn into the interior of the vehicle. A design of this type is shown in U.S. application Ser. No. 195,150, filed Oct. 8, 1980, the entire disclosure of which is incorporated herein by reference. This design is particularly effective in directing relatively large volumes of air toward the vehicle's occupants. However, because of the scooping effect provided by the sunroof panel, foreign articles such as bugs, rocks and the like may also be drawn in through the sunroof opening and constitute projectiles which are deflected toward the vehicle's occupants at speeds in excess of 50 mph. Such projectiles pose an obvious safety hazard, particularly to the vehicle's driver since even relatively small particles of dirt or the like cast into the driver's eye may impair his vision, thereby causing the driver to lose control of the vehicle.

It would be desirable to screen or filter the incoming air in some manner. However, the construction and mounting of such a screen is complicated by the fact that one or more latching assemblies are present along the leading edge of the sunroof opening for holding the forward edge of the panel in an elevated position. Moreover, removable type sunroof panel assemblies are often installed after the vehicle has been manufactured; consequently, the design of vehicle roofs does not include a provision for storing such a screen when the roof panel is either closed or removed from the roof.

It is therefore an important object of the present invention to provide an air screen for a removable sunroof of the type described above which extends essentially across the entire width of the scoop-like opening between the sunroof panel and the roof.

Another object of the present invention is to provide an air screen of the type described above which allows access to latching assemblies connecting the panel to the roof, but yet which does not interfere with rapid removal of the panel from the roof.

A still further object of the invention is to provide an air screen as described above which is economical and simple in construction, but yet which automatically shifts to a storage position when the panel is drawn into its closed position.

A still further object of the invention is to provide an air screen as described above which provides a means for regulating the volume of air flowing therethrough and which also functions as an air deflector to eliminate buffeting noises, particularly when the panel is removed from the roof.

These and further objects of the invention will be made clear or will become apparent during the course of the following description of a preferred embodiment of the invention.

DISCLOSURE OF THE INVENTION

An air screen for vehicle sunroofs of the type employing a sunroof panel whose leading edge may be pivoted upwardly above the roof to form an air scoop extends between leading edges of the sunroof panel and the roof to regulate air flow and prevent potentially dangerous projectiles from being carried into the vehicle's interior along the air flow. The air screen is formed from flexible plastic material and automatically shifts to a storage position when the sunroof panel is pivoted from an open, scoop position to a closed position. The air screen may be secured to either the sunroof panel or the roof and consists of two slidable halves which may be adjusted to regulate the flow of air therethrough. The air screen also functions as an air deflector to prevent noise created by wind buffeting when the panel is removed from the roof.

BRIEF DESCRIPTION OF THE DRAWINGS

In the drawings, which form an integral part of the specification and are to be read in conjunction therewith, and in which like reference numerals are used to designate identical components in the various views.

BEST MODE FOR CARRYING OUT THE INVENTION

Referring first to FIGS. 1-9, the present invention broadly concerns an air screen 26 particularly adapted for use with a sunroof assembly 20 installed in the roof 22 of a vehicle.

Figure 4:
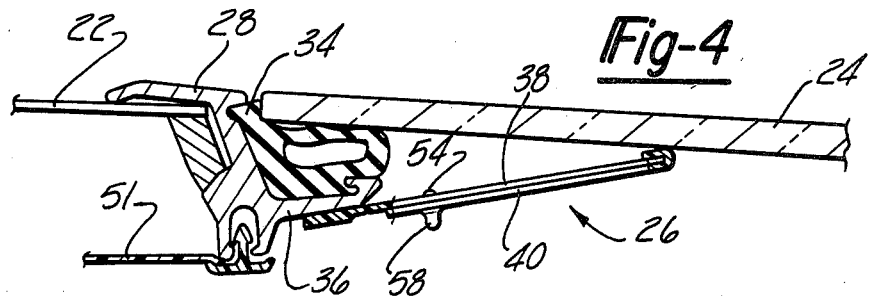
FIG. 4 is a cross sectional view similar to FIG. 3, but showing the sunroof panel in a closed position.

Sunroof assembly 20 includes a rectangularly-shaped frame 28 secured to the roof 22 and defining the perimeter of an opening 23 in the roof 22. Frame 28 includes an inwardly extending leg 36 which provides a channel for supporting a sealing gasket 34 that extends around the entire perimeter of the frame 28. A sunroof panel 24, which may comprise glass or other suitable material, is adapted to overlay the opening 20 and engages gasket 34 to produce a water-tight seal when the panel 24 is in the closed position thereof as shown in FIG. 4.

Figure 1:
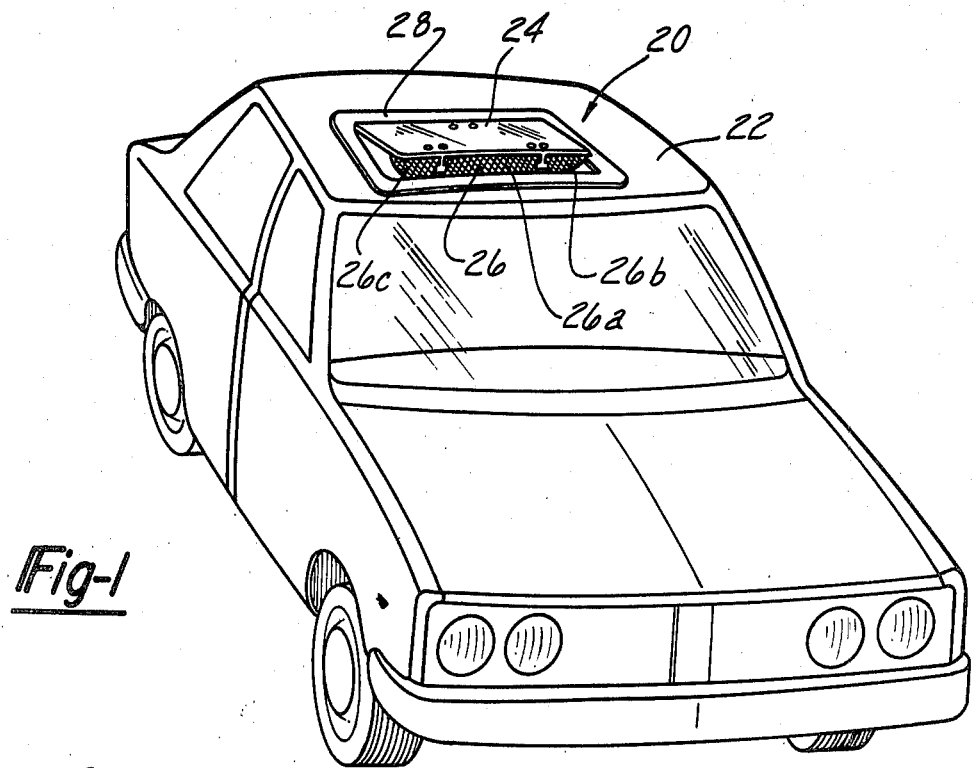
FIG. 1 is a perspective view of a vehicle provided with a sunroof assembly which includes the air screen of the present invention, the sunroof panel being depicted in an open, scoop position.
Figure 2:
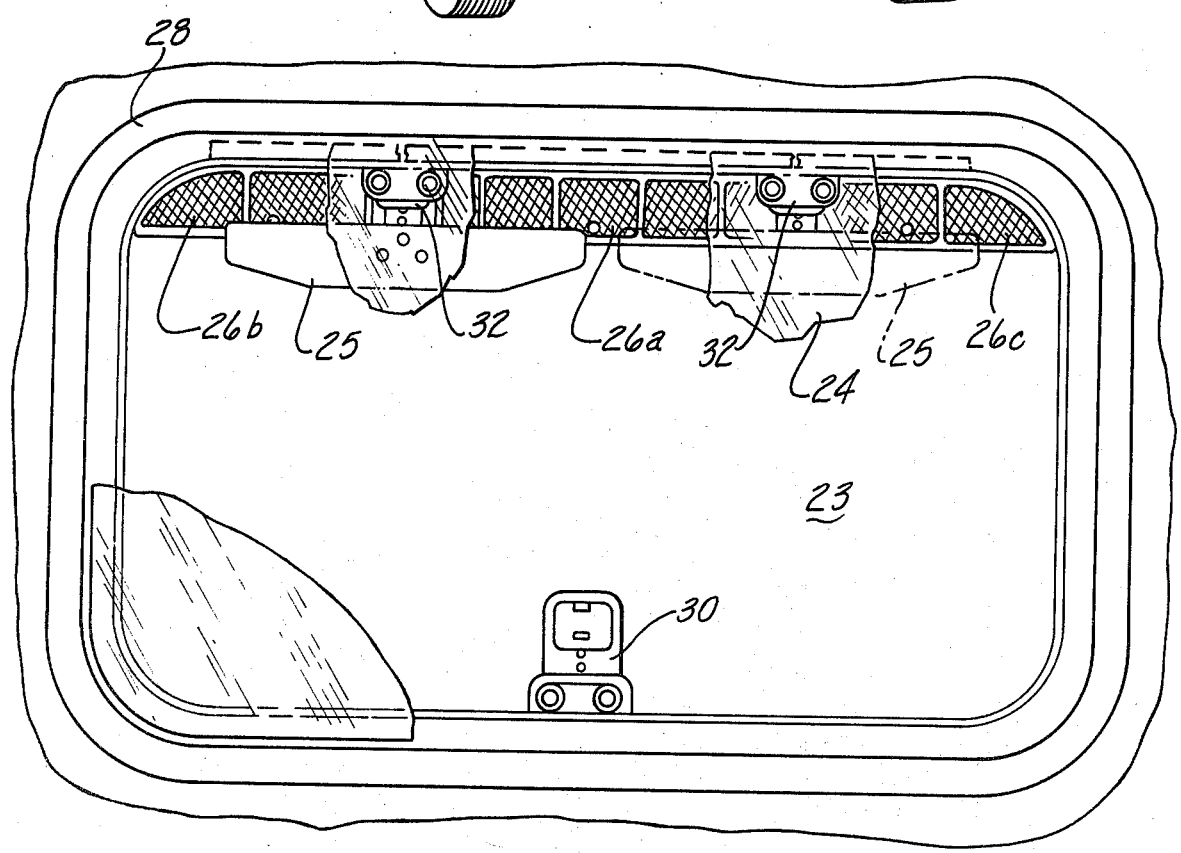
FIG. 2 is a plan view of the sunroof assembly, but showing the panel in a closed position.
Figure 3:
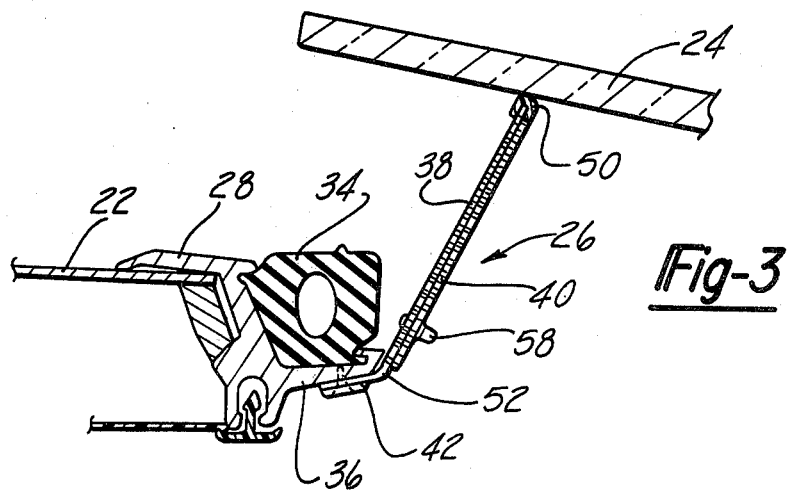
FIG. 3 is a fragmentary, cross sectional view, taken on a larger scale, of the leading edge of the sunroof assembly, the sunroof panel being depicted in an elevated, scoop position.

Panel 24 is pivotally connected to the frame 28 along the rear edge thereof by a rear latching assembly 30. A pair of spaced apart, forward latching assemblies 32 disposed along the leading edge of frame 28 secure the leading edge of panel 24 to the frame 28. More particularly, as described in the patent application mentioned previously, latching assemblies 32 not only function to lock panel 24 in a closed position, but further operate to lock panel 24 in an elevated position above roof 22, as shown in FIG. 3.

If desired, one or more air deflectors 25 pivotally connected to the frame 28 beneath the panel 24 may be employed in combination with the air screen 26 of the present invention.

Air screen 26 comprises a first section 26a extending between latch assemblies 32 and second and third sections 26b and 26c respectively disposed on opposite sides of latch assemblies 32. Each of the air screen sections 26a, 26b and 26c comprises an assembly including first and second, essentially planar body halves 38 and 40 disposed in face-to-face engagement with each other. Each of the body halves 38 and 40 is preferably formed of a relatively flexible plastic material. Body half 40 includes a rectangularly-shaped mounting flange 42 connected to an outer solid frame 43 by a plastic hinge line 52. Mounting flange 42 is secured, as with screws, to the lower, interior face of leg 36 along the leading edge of frame 28. Frame 43 is biased to extend upwardly, at an acute angle with respect to the plane of mounting flange 42, but may be pivoted about hinge line 52 to an essentially coplanar position with flange 42, as shown in FIG. 4.

Body half 40 is provided with a multiplicity of tapered openings 48 therethrough within the frame 43. A reinforcement rib 44 extending between opposite sides of the frame 43 includes a slot 56 therein for purposes which will become apparent hereinafter.

Body half 38 includes a solid frame 41 therearound which is essentially a mirror image of frame 43, and is also provided with a multiplicity of openings 46 therethrough arranged in a pattern substantially identical to openings 48, with the exception of the fact that the direction of their taper is opposite that of openings 48.

Body half 38 is mounted in essentially face-to-face contact with body half 40 by means of a lip 50 on the upper edge of body half 38 which defines a channel 50 within which the upper edge of body half 40 is slidably received. A connecting element 54 extending outwardly from reinforcement rib 47 on body half 38 includes a bulbous extremity 55 which is snapped through slot 56 to maintain lower portions of body halves 38 and 40 in face-to-face engagement. The opposing, engaging faces of body halves 38 and 40 are essentially flat to permit smooth sliding action therebetween.

A small handle 58 extending outwardly from the exterior of body half 38 allows the user to slide body half 38 transversely relative to the body half 40; sliding movement of body halves 38 and 40 relative to each other controls the degree of alignment between openings 46 and 48, thus regulating the volume of air which may flow through the screen sections 26a, 26b and 26c. The limits of sliding movement are defined by the width of slot 56; preferably, the air screen sections 26a, 26b and 26c are adjustable between a closed position wherein each of the openings 46 and 48 are completely blocked, to a completely open position to allow maximum air flow therethrough.

Air screen sections 26b and 26c are provided with arcuately-shaped outer extremities, while the inner extremities thereof adjacent latching assemblies 32 include cutouts 39 which extend around a portion of the latching assemblies 32. Air screen section 26a is generally rectangular in shape and is provided with a pair of cutouts 39 on opposite extremities thereof for receiving portions of the latching assemblies 32 therein.

As best seen in FIGS. 3 and 4, the upper edge of air screen 26 slidably engages the interior surface of sunroof panel 24 and is biased upwardly thereagainst due to the natural resiliency of the plastic hinge line 52. Such biasing influence is sufficient to maintain the upper edge of air screen 26 engaged with panel 24, even when struck by small rocks, bugs and the like.

Upon pivoting of the panel 24 downwardly to the closed position, the lower surface of panel 24 slidably bears against the upper edge of air screen 26, thereby forcing the latter to pivot about hinge line 52 to a storage position, as shown in FIG. 4. The natural resiliency of the plastic material defining hinge line 52 automatically biases the air screen 26 to pivot upwardly when the panel 24 is reopened.

Figure 5:
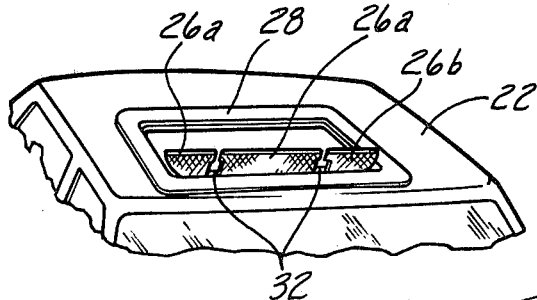
FIG. 5 is a perspective view of the sunroof assembly with the sunroof panel having been removed therefrom.
Figure 6:
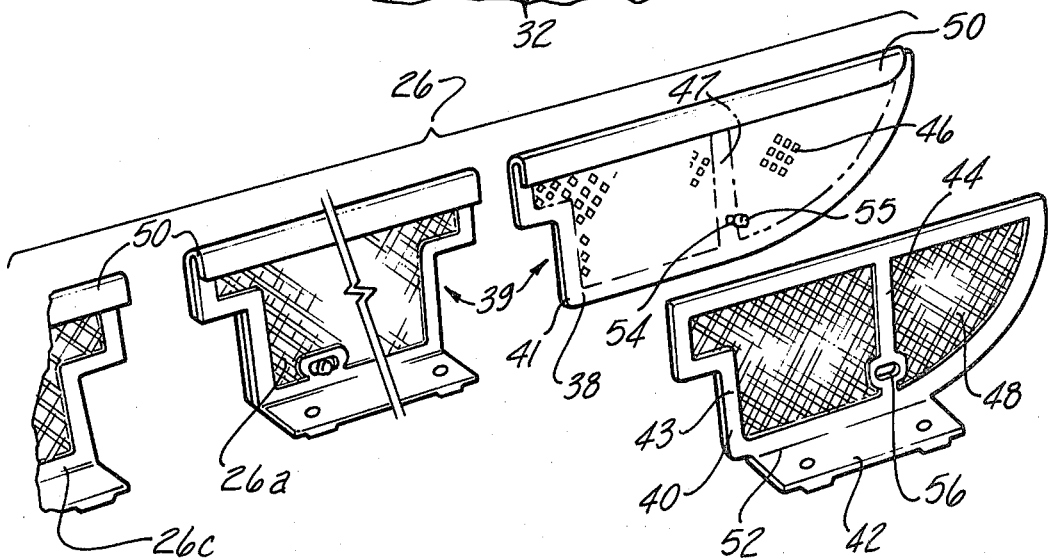
FIG. 6 is an exploded, fragmentary, perspective view of the air screen which forms the preferred embodiment of the present invention.
Figure 7:
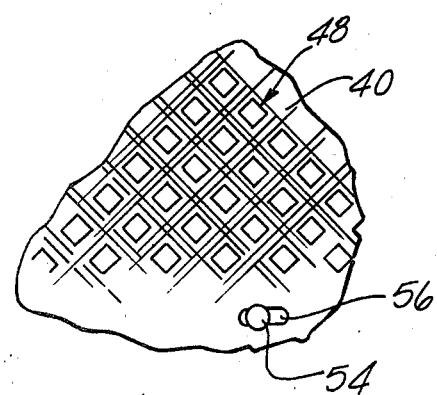
FIG. 7 is a plan view, taken on a larger scale, of a portion of the screen surface of the air screen, the air screen halves being aligned to permit maximum air flow therethrough.
Figure 8:
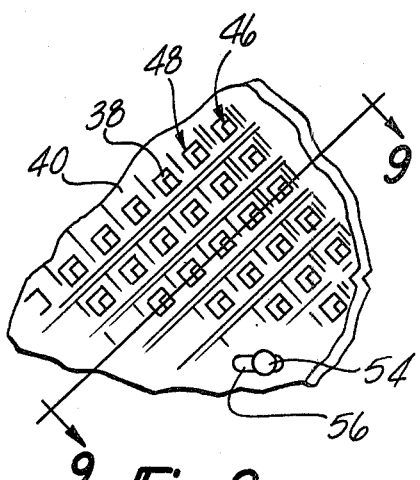
FIG. 8 is a view similar to FIG. 7 but showing one of the air screen halves having been shifted to reduce the volume of air flow therethrough.
Figure 9:
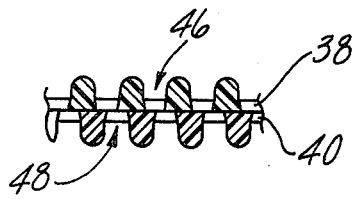
FIG. 9 is a cross sectional view taken along the line 9—9 in FIG. 8.

When the panel 24 is completely removed from the assembly 20, as shown in FIG. 5, the air screen 26 not only functions to regulate the amount of air entering the interior of the vehicle and screens debris, but further functions as an air deflector which deflects air away from the opening 23 in a manner which prevents irritating noise due to the effects of wind buffeting.

Figure 10:
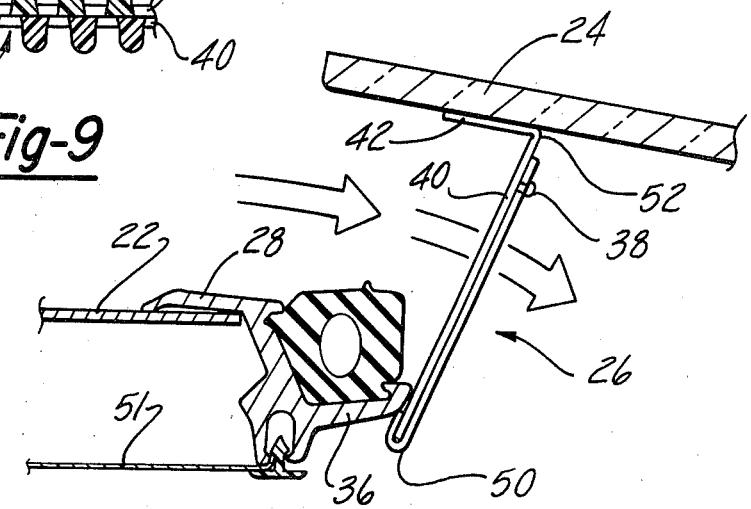
FIG. 10 is a fragmentary, cross sectional view of the leading edge of the sunroof assembly, and depicting an alternate form of the air screen of the present invention.

Attention is now directed also to FIG. 10 wherein the wind screen 26 is depicted in an alternate mounting position, secured to the sunroof panel 24, rather than the frame 28. The mounting flange 42 is secured to the interior face of sunroof panel 24 by any suitable means such as screws or adhesive. Body halves 38 and 40 extend downwardly from panel 24 and forwardly toward the leading edge of frame 28. The exterior face of body half 40 slidably engages the leg 36 of frame 28 and is biased thereagainst by the natural resiliency of the plastic material from which the air screen 26 is comprised. The embodiment depicted in FIG. 10 is different from that previously described only with respect to the angle between body halves 38 and 40 and mounting flange 42. When the panel 24 is pivoted downwardly to a closed position, it can be appreciated that body halves 38 and 40 are biased into engagement with the frame 28 and/or headliner 51 so as to project a minimum distance below the sunroof assembly 20.

From the foregoing, it is apparent that the air screen described above not only provides for the reliable accomplishment of the objects of the invention, but does so in a particularly effective and efficient manner. It is recognized, of course, that those skilled in the art may make various modifications or additions to the preferred embodiment chosen to illustrate the invention without departing from the spirit or scope of the present contribution to the art. For example, the air screen has been described herein as consisting of three separate sections, which allow the volume of air entering the vehicle to be adjusted individually at three locations along the leading edge of the sunroof opening. Obviously, a one-piece air screen embodying the concepts of the present invention may be effectively employed if desired. Accordingly, it is to be understood that the protection sought and to be afforded hereby should be deemed to extend to the subject matter claimed and all equivalents thereof fairly within the scope of the invention.

What is claimed is:

1. A sunroof assembly for a vehicle having a roof provided with an opening therein, comprising:
   a sunroof panel adapted to overlie said opening and including a leading edge extending transversely across said roof;
   means for supporting the leading edge of said panel in an elevated position above said roof whereby to define an opening between said roof and said leading edge of said panel through which outside air may enter the interior of said vehicle;
   means extending between said leading edge of said panel and said roof for screening the air passing through said opening, said screening means including a first portion secured to said roof, and a second portion hingedly coupled with said first portion and slideably engaging said panel; and,
   means for biasing said second portion of said screening means into sliding engagement with said panel.

2. The sunroof assembly of claim 1, wherein said first and second portions are comprised of plastic material and said biasing means is defined by a resilient plastic connection between said first and second portions.

3. The sunroof assembly of claim 1, wherein said second portion includes a generally planar member having a multiplicity of openings therein through which air may pass.

4. The sunroof assembly of claim 1, wherein said screening means includes means for adjusting the rate at which air passes through said opening.

5. The sunroof assembly of claim 4, wherein said screening means includes a first screen member having a multiplicity of openings defined therein through which air may pass and said adjusting means includes a second screen member having a multiplicity of openings therein and disposed essentially in side-by-side relationship to said first screen member, said second screen member being shiftable relative to said first member whereby to permit the openings in said first and second screens to be selectively aligned.

6. The sunroof assembly of claim 1, wherein said screening means includes at least one cutout area therein for allowing access to said supporting means from a position inside said vehicle.

7. A sunroof assembly for a vehicle having a roof provided with an opening therein, comprising:
   a sunroof panel overlying said opening and including a leading edge extending transversely across said roof;
   means for supporting the leading edge of said panel in an elevated position above said roof whereby to define an opening between said roof and said leading edge of said panel through which outside air may enter the interior of said vehicle,
   said supporting means including a pair of latching assemblies transversely spaced apart along said leading edge of said panel and extending across said opening; and,
   means extending between said leading edge of said panel and said roof for screening the air passing through said opening, said screening means including first, second and third discrete sections, said first section extending between said latching assemblies, said second and third sections being respectively disposed on opposite sides of said pair of latching assemblies,
   each of said sections including a free outer edge engaging said panel, means for pivotally mounting the corresponding section on said roof and means for biasing the corresponding section to pivot said free outer edge into biased engagement with said panel.

8. An air screen for use with a vehicle having a roof provided with a sunroof opening therein and a sunroof panel overlying said opening, said panel having a leading edge elevatable above said roof to define an air intake opening through which outside air may enter said vehicle, comprising:
   a screen member extending between said panel and said roof adjacent said leading edge of said panel, said screen member including a multiplicity of openings therein through which outside air may pass,
   said screen member including a lower edge disposed adjacent the leading edge of said roof opening and an upper edge spaced rearwardly from said lower edge and contacting said panel;
   means for mounting said screen to one of said roof or said panel;
   means for pivotally connecting said mounting means with one of said edges of said screen member; and,
   means for biasing the other of said edges into engagement with one of said roof or said panel.

9. The sunroof assembly of claim 8, wherein said screen member is mounted on said panel.

10. The air screen of claim 8, wherein said pivotal connecting means includes a plastic hinge extending along said leading edge of said roof opening, and said biasing means includes resilient means in said plastic hinge urging said screen member to pivot upwardly into contact with said panel.

11. The air screen of claim 10, wherein said screen member, said mounting means and said hinge are formed integral with each other and are comprised of plastic material.

12. The air screen of claim 10, wherein said mounting means includes a flange secured to the interior face of said roof along said leading edge of said opening.

13. The air screen of claim 8, wherein said screen member is inclined rearwardly from said leading edge of said opening and slidably engages said panel.

14. The air screen of claim 8, wherein said mounting means includes a flange secured on said panel for mounting said screen member on said panel and said screen member slidably engages said roof along said leading edge of the latter.

15. The air screen of claim 8, including means for adjusting the volume of outside air passing through said screen member.

16. The air screen of claim 8, wherein said screen member includes:
   first and second screen halves each having an essentially identical pattern of said openings therethrough and mounted in substantial face-to-face relationship to each other, and
   means for mounting at least one of said first and second halves in sliding relationship to the other thereof.

17. The air screen of claim 16, wherein said first and second screen halves are substantially planar and said means for mounting said first and second screen halves for sliding relationship includes a channel on one of said first and second screen halves within which a portion of the other of said screen halves is slidably received.

18. The air screen of claim 16, wherein one of said screen halves includes a manually manipulable handle portion for sliding one of said screen halves.

19. A sunroof assembly for a vehicle having a roof provided with an opening therein, comprising:
- a sunroof panel overlying said opening and including a leading edge extending transversely across said roof;
- means of supporting said leading edge of said panel for movement between an open position elevated above said roof and a closed position engaging said roof;
- means extending between and engaging said panel and said roof adjacent said leading edge for screening air passing between said roof and said leading edge when said leading edge is in said open position thereof;
- means for pivotally mounting said screening means between said roof and said panel and for pivotal movement about an axis extending essentially parallel to said leading edge; and
- means for biasing said screening means to pivot about said axis into engagement with said panel.

* * * * *